Patented Dec. 2, 1941

2,264,534

UNITED STATES PATENT OFFICE 2,264,534

THERMOPLASTIC BITUMINOUS PRINTING INK

Wilbur L. Jones, New York, N. Y., assignor to Interchemical Corporation, New York, N. Y., a corporation of Ohio No Drawing. Application December 8, 1938, Serial No. 244,606

8 Claims. (Cl. 106—31)

This invention relates to bituminous thermoplastic printing inks adapted to be printed in the molten state, and has particular reference to such compositions which are specially designed to produce prints on paper comparing favorably with prints produced by the best conventional bituminous printing inks printed by conventional methods.

Printing with molten compositions is an old process. The method has been used principally for the production of "spot" carbon paper, where the carbon composition is confined to certain areas of the sheet, and for the production of thermoplastic transfers on paper, designed to be transferred to a fabric by the use of a hot iron.

The thermoplastic method of printing has certain obvious advantages over printing cold with conventional inks which are liquid at room temperature. In order to dry conventional inks, the liquid vehicle must be solidified; and this requires either a long time, as with the drying oil inks, or the removal of volatile solvents in an elaborate ventilating system, whereas the molten inks dry rapidly by mere cooling, without loss of any portion of the material.

Attempts to replace conventional inks with thermoplastic inks have, however, produced uniformly disappointing results. One serious difficulty has been the tendency of the ordinary thermoplastic melts to offset from one sheet of paper to the next when stored in stacks, causing sticking of the sheets to one another; this occurs even with compositions having melting points above the maximum temperatures of the storage space, due to the pressure exerted by the weight of the paper. A second objection to such prints has been their waxy feel, and their tendency to rub off more than conventional colored rotogravure inks. The most serious difficulty, however, has been the poor printing characteristics of such inks; the appearance of the prints has generally been so much poorer than that obtainable with conventional inks that the process has generally been abandoned as unsatisfactory.

In my co-pending application, Serial Number 244,607, filed December 8, 1938, I have disclosed that these objections to thermoplastic printing inks can be entirely overcome, and intaglio prints obtained which compare most favorably with conventional solvent ink prints, by formulating the inks so that the vehicles consist of a major portion of normally solid microcrystalline solvent material (such as the natural resin-free waxes of animal, vegetable and mineral origin, and the synthetic waxy materials such as high molecular weight alcohols and esters, and fully hydrogenated oils and oil acids, hereinafter referred to generically as solvent waxes) and a minor portion of viscosity imparting material, such as resin, which is soluble in the solvent wax both in the molten and the solid state, provided the ingredients are so chosen that the composition has a melting point between 150 and 300° F., and provided further that the composition has proper viscosity characteristics. In that application, I disclosed that any vehicle from which a good ink could be produced must have a minimum viscosity of at least one poise at some point before crystallization commenced in its cooling from a molten state, and that at least about 5% of resin was required to obtain such a viscosity with the solvent waxes. The upper limit of viscosity is there disclosed as fixed by the appearance of a screen effect in the finished prints when the printing is done at a temperature within 40° F. of the melting point of the ink, and 30% of resin was found to be the maximum permissible.

In the application of this principle to inks containing bituminous materials which impart both color and viscosity to solvent waxes when dissolved therein, I have discovered that when typical high-color bitumens (which are actually mixtures, in varying proportions, of asphaltic resins, asphaltenes, inert pigment material and, in some cases, a small proportion of microcrystalline solvent material closely analogous to the solvent waxes) are added to waxes in quantities sufficient to give substantial color value, they produce very complex mixtures which do not yield simple cooling curves like mixtures of ordinary resins with solvent waxes. In order to get good printing with such complex bituminous mixtures, it is necessary to print at about 20° F. above the melting point of the ink, as compared with temperatures at or below the melting point preferably used with my non-bituminous inks.

As with ordinary resins, quantities as low as five per cent. of bitumen will produce sufficient viscosity to give good printing characteristics, but such small quantities yield little color value. However, higher upper limits prevail with the bitumens because of the inclusion of non-resinous components in the bitumens. With bituminous resins substantially free from microcrystalline solvent material, such as gilsonite, about 40% of bitumen represents a top limit, while up to 50% of bitumen may be used in the case of high color waxy pitches such as montan pitch, or in the case of mixtures of bitumens having a solvent action on one another. Optimum results are obtainable, however, in the range of 20 to 30% for the gilsonite type of bitumen, and in the range of 25 to 35% with the waxy pitches and bitumen mixtures.

The use of high color bitumens as viscosity imparting materials in my inks reduces or eliminates the necessity for pigmenting the inks. If pigment is desired, it may be added ground in a minimum quantity of liquid oil or oleoresinous varnish, or it may be dispersed in the vehicle on a rubber mill, or in the melted vehicle in a heated ball mill.

Typical examples of my invention are the following:

Example 1

25 parts by weight gilsonite (contains 10 to 20% fixed carbon)
75 parts by weight hydrogenated soya bean oil (M. P. 150° F.)

The soya bean oil is melted to 200° F., and the gilsonite added slowly, raising the temperature gradually to 300° F.; when solution is complete, the melt is cooled. This ink has a melting point of about 160° F., and is printable without excessive tack at 170° F., to give a pleasing brown print.

Hydrogenated soya bean oil is a particularly good gilsonite solvent.

Example 2

25 parts by weight gilsonite
67 parts by weight hydrogenated soya bean oil
2 parts by weight carbon black—ground in
5 parts by weight lithographic varnish No. 0
1 part by weight oil-soluble red dye This ink prints very satisfactorily at 165° F., and has a melting point of about 155° F.

Example 3

20 parts by weight gilsonite
56 parts by weight hydrogenated soya bean oil
15 parts by weight crude montan wax (M. P. 170° F.)
1 part by weight carbon black—and
5 parts by weight chrome orange pigment—ground in
3 parts by weight lithographic varnish No. 0

This ink has a melting point of about 190° F and is printable at a temperature of 200° F. The prints are noticeably rub-proof.

Example 4

1 part by weight carbon black is ground in
2 parts by weight #000 litho varnish, and added to
23 parts by weight gilsonite
23 parts by weight montan pitch (M. P. 172° F.)
51 parts by weight hydrogenated soya bean oil This ink has a melting point of 165° F. and prints well at 175° F. It represents a conjoint use of a waxy pitch, and a mixture of pitches.

Example 5

15 parts by weight coal tar pitch (M. P. 150° F.)
25 parts by weight gilsonite
40 parts by weight hydrogenated soya bean oil
20 parts by weight crude montan wax This ink has a melting point of 150° F., and prints well at 170° F. The coal tar pitch is an excellent blending agent for the gilsonite, and enables the high percentage of combined bitumen to be used.

Example 6

25 parts by weight petroleum pitch M. P. 200–210° F.
20 parts by weight gilsonite
45 parts by weight crude montan wax
10 parts by weight hydrogenated fish oil acid (M. P. 130° F.)

This ink has a melting point of 200° F., and is printable at about 225° F. The petroleum pitch acts partially as a fluxing agent for the gilsonite.

Other bitumens can obviously be used to replace those shown. I have used various other petroleum pitches, hard stearin pitches, coal tar pitches and the like.

In the claims, the term "solvent wax" is used in its generic sense to refer to microcrystalline materials of waxy nature, and it includes the natural resin-free waxes of animal, vegetable and mineral origin, the synthetic waxy materials such as high molecular weight alcohols and esters, and hydrogenated fatty oils and oil acids. Such waxes are described as amorphous in my co-pending joint application with Earl H. McLeod, Serial Number 147,210; it is to be understood that this describes the visible appearance of the waxes used, and was not intended to describe their appearance under a high-powered microscope.

I claim:

1. A bituminous thermoplastic printing ink having a melting point between 150 and 300° F. and containing a vehicle comprising at least 50% by weight of a solvent wax, and between 5 and 50 per cent. of a bitumen.

2. A bituminous thermoplastic printing ink having a melting point between 150 and 300° F. and containing a vehicle comprising at least 50% by weight of a solvent wax, and between 5 and 40 per cent. of a bitumen free from microcrystalline wax material.

3. A bituminous thermoplastic printing ink having a melting point between 150 and 300° F. and containing a vehicle comprising at least 50% by weight of a solvent wax, and between 5 and 40 per cent. of gilsonite.

4. A bituminous thermoplastic printing ink having a melting point between 150 and 300° F. and containing a vehicle comprising at least 50% by weight of a solvent wax, and between 20 and 30 per cent. of gilsonite.

5. A bituminous thermoplastic printing ink having a melting point between 150 and 300° F. and containing a vehicle comprising at least 50% by weight of a hydrogenated fatty oil of the solvent wax type, and between 5 and 40 per cent. of gilsonite.

6. A bituminous thermoplastic printing ink having a melting point between 150 and 300° F., and containing a vehicle comprising at least 50% by weight of hydrogenated soya bean oil and 20 to 30 per cent. of gilsonite.

7. A bituminous thermoplastic printing ink having a melting point between 150 and 300° F., and containing a vehicle comprising at least 50% by weight of a solvent wax and between 5 and 50% of a mixture of bitumens, one of which is gilsonite and the other of which is a bitumen having a solvent action on the gilsonite.

8. A bituminous thermoplastic printing ink having a melting point between 150 and 300° F. and containing a vehicle comprising a minor proportion of gilsonite and a major proportion of a normally solid microcrystalline solvent therefor.

WILBUR L. JONES.